(12) United States Patent
Ichikawa et al.

(10) Patent No.: US 7,882,272 B2
(45) Date of Patent: Feb. 1, 2011

(54) MEDIA PROCESSING DEVICE AND CONTROL METHOD FOR A MEDIA PROCESSING

(75) Inventors: Mahito Ichikawa, Matsumoto (JP); Kazuya Toshima, Ueda (JP); Keisuke Tsunoda, Toami (JP)

(73) Assignee: Seiko Epson Corporation, Tokyo (JP)

( * ) Notice: Subject to any disclaimer, the term of this patent is extended or adjusted under 35 U.S.C. 154(b) by 307 days.

(21) Appl. No.: 11/906,654

(22) Filed: Oct. 3, 2007

(65) Prior Publication Data

US 2008/0104305 A1      May 1, 2008

(30) Foreign Application Priority Data

Oct. 3, 2006      (JP)      .............................. 2006-271953

(51) Int. Cl.
*G06F 3/00*      (2006.01)
(52) U.S. Cl. ......................................................... 710/5
(58) Field of Classification Search ........................ None
See application file for complete search history.

(56) References Cited

U.S. PATENT DOCUMENTS

| | | | |
|---|---|---|---|
| 5,518,230 | A | 5/1996 | Scarlata et al. |
| 5,790,779 | A | 8/1998 | Ben-Natan et al. |
| 6,222,800 | B1 | 4/2001 | Miller et al. |
| 6,400,659 | B1 | 6/2002 | Kitaoka |
| 6,490,232 | B2 * | 12/2002 | Sato .......................... 369/30.34 |
| 2005/0157605 | A1 | 7/2005 | Lilland et al. |

| | | |
|---|---|---|
| 2006/0087070 | A1 | 4/2006 Cook et al. |

FOREIGN PATENT DOCUMENTS

| | | |
|---|---|---|
| JP | 06-111379 A | 4/1994 |
| JP | 06-135103 A | 5/1994 |
| JP | 07-186462 A | 7/1995 |
| JP | 2000-260172 A | 9/2000 |
| JP | 2002-279359 A | 9/2002 |
| JP | 2005-259318 A | 9/2005 |

OTHER PUBLICATIONS

Office Action for U.S. Appl. No. 11/973,046 dated Jan. 26, 2010.
Office Action for U.S. Appl. No. 11/973,046 dated Aug. 12, 2009.

* cited by examiner

*Primary Examiner*—Matthew Luu
*Assistant Examiner*—Justin Seo
(74) *Attorney, Agent, or Firm*—Nutter McClennen & Fish LLP; John J. Penny, Jr.; Rory P. Pheiffer

(57) ABSTRACT

A media processing device has a media drive for writing data on one side of recording media, a label printer for printing on the other side of the media M, media stackers for storing the media, and a transportation arm for transporting the media to any of the media drive, the label printer, and the media stackers according to control commands sent from a host computer. The control method for the media processing device has an execution step of starting executing a plurality of control commands based on a start process command; a decision step of determining if all of the control commands executed normally; and a transmission step of sending a normal termination report to the host computer as the response to the end process command that is sent as a set with the start process command if step determines that all control commands executed normally.

20 Claims, 11 Drawing Sheets

US 7,882,272 B2

MEDIA PROCESSING DEVICE AND CONTROL METHOD FOR A MEDIA PROCESSING

Priority is claimed under 37 U.S.C. §119 to Japanese Patent Application No. 2006-271953 filed Oct. 3, on 2006, which is hereby incorporated by reference in its entirety.

TECHNICAL FIELD

The present invention relates to a media processing device and a control method for a media processing device that writes data to one side of a target medium such as CD and DVD discs and prints on the other side of the medium.

BACKGROUND TECHNOLOGY

Media such as CD and DVD discs to which data has been written are used for exchanging data. Data is exchanged using such media instead of paper documents particularly when the volume of data is great.

Media such as CDs on which data has been recorded are produced by media processing devices commonly called CD publishers. The media processing device supplies a blank CD stored in a blank media stacker to a CD drive, writes the data, and then prints on the label side of the CD using a label printer to create the CD. See, for example, Japanese Unexamined Patent Appl. Pub. JP-A-2005-259318.

Conventional media processing devices execute a specific process each time a command is sent from the host computer, and then return a response. When a response from the media processing device is received, the host computer interprets the process result from the response and outputs the next command if the first process is determined to have been executed normally. If the process did not execute normally, the next command is not sent and the process ends. The same operation then repeats, that is, the host computer sends a command to the media processing device, the media processing device executes a specific process according to the received command, and then returns a response to the host computer.

Japanese Unexamined Patent Appl. Pub. JP-A-H07-186462 teaches a recording apparatus that executes a data process according to a command from a host computer. When the data process ends, the recording apparatus executes a termination process and an initialization process. If a communication error occurs while the termination process or initialization process is executing, communication error information is displayed on the operating panel. If there is a status inquiry from the host computer, error information is returned as the response to the host computer.

Japanese Unexamined Patent Appl. Pub. JP-A-H06-135103 teaches a recording apparatus that has a printing control unit and a printing mechanism unit. The printing control unit and the printing mechanism unit exchange commands with each other. When a parameter command is received from the printing control unit, the printing mechanism unit sends a transmission request for one page of data to the printing control unit. When the one page of data is received and the printing process ends, the printing mechanism unit returns a termination signal to the printing control unit. This process repeats for each page. More specifically, every time the printing process for one page of data ends, the printing mechanism unit sends a termination signal informing the printing control unit that printing ended.

Data communication between the host computer and the media processing device is described more specifically with reference to FIG. 11. As shown in the figure, the host computer first sends a command 1 to the media processing device (the actual process being executed by firmware). When the media processing device receives this command 1, the media processing device runs the process corresponding to the command and returns response 1. Command 1 is a command for moving the arm to pick up a blank CD, for example, and when the media processing device receives this command, the media processing device moves the arm to the blank media stacker.

When the host computer receives response 1, it interprets the content and determines if the process corresponding to command 1 executed normally (analysis 1). If the process executed normally, the host computer sends command 2. If the process corresponding to command 1 did not execute normally, the host computer stops the process.

When the media processing device receives command 2, it executes the process corresponding to the command 2 and returns response 2. Command 2 is a blank CD pick-up command, for example, and when this command is received, the media processing device moves the arm to the blank media stacker and picks up one blank CD from the blank media stacker.

When response 2 is received, the host computer interprets the content and determines if the process corresponding to command 2 executed normally (analysis 2). If the process executed normally, the host computer sends command 3. If the process corresponding to command 2 did not execute normally, the host computer stops the process.

The same operation continues to repeat. The host computer thus operates in a send command—receive response—interpret response sequence, and the media processing device operates in a receive command—execute command—send response sequence. This process of returning a response to the host computer each time one command is executed is described, for example, in Japanese Unexamined Patent Appl. Pub. JP-A-2002-279359.

Because the media processing device of the related art thus sends a response to the host computer every time a command is received and the host computer interprets the received content every time a response is received, data traffic is high and the communication processes are frequent, and processing performance between the host computer and the media processing device is not good.

SUMMARY OF THE INVENTION

The present invention provides a media processing device and a media processing device control method that improve processing performance between the host computer and the media processing device.

A first aspect of at least one embodiment of the invention is a media processing device that has a media drive that applies a data writing process to one side of a target medium; a printer that applies a printing process to the other side of the target medium; a media stacker that stores the target medium; and a media transportation mechanism that transports the target medium to any one of the media drive, the printer, and the media stacker according to a control command sent from a host computer. The media transportation mechanism starts executing a plurality of control commands based on a start process command, and if the media transportation mechanism determines that all of the control commands are executed normally, sends a normal termination report to the host computer as the response to the end process command that is sent as a set with the start process command.

Another aspect of at least one embodiment of the invention is a control method for a media processing device that has a media drive that applies a data writing process to one side of a target medium; a printer that applies a printing process to the other side of the target medium; a media stacker that stores the target medium; and a media mechanism that transports the target medium to any one of the media drive, the printer, and the media stacker according to a control command sent from a host computer. The control method includes the following steps: starting executing a plurality of control commands based on a start process command; determining if all of the control commands executed normally; and sending a normal termination report to the host computer as the response to the end process command that is sent as a set with the start process command if the decision step determines that all control commands executed normally.

An aspect of at least one embodiment of the invention thus sequentially executes target media transportation processes according to a plurality of control commands when triggered by a start process command, and if all of the control commands execute normally, returns a normal termination report to the host computer as the response to the end process command that is sent as a set with the start process command. Compared with the related art method of returning a response each time a single command is received from the host computer, the number of times responses are sent and received is therefore reduced. In addition, the time required for the host computer to interpret the response and send the next command can also be shortened. The amount of communication data and the communication time are therefore reduced, and processing performance between the host computer and the media processing device is improved.

In the media processing device according to another aspect of at least one embodiment of the invention, the media transportation mechanism sends an error report for the control command that could not execute normally to the host computer as the response to the end process command if any one of the plural control commands is determined to have not executed normally.

In the control method for a media processing device according to another aspect of at least one embodiment of the invention, if the decision step determines that any one of the plural control commands did not executed normally, an error report for the control command that could not execute normally is sent to the host computer as the response to the end process command.

If any one of the processes could not be executed normally when the processes corresponding to the plural control commands are sequentially executed, this aspect of the invention immediately reports the control command that could not be executed normally to the host computer. The host computer can therefore know what command produced an error, and can quickly determine where the problem is in the media processing device.

In the media processing device according to another aspect of at least one embodiment of the invention, the transportation mechanism aborts execution of all remaining control commands if there is a control command that could not execute normally.

In the media processing device control method according to another aspect of at least one embodiment of the invention, execution of all remaining control commands is aborted if the decision step determines that there is a control command that could not execute normally.

If there is a control command that could not execute normally, this aspect of the invention aborts execution of all remaining control commands and thus avoids executing meaningless processes.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Embodiment 1

A first embodiment of a media processing device according to the present invention is described below with reference to the accompanying figures.

Arrangement of the Media Processing Device

Figure 1:
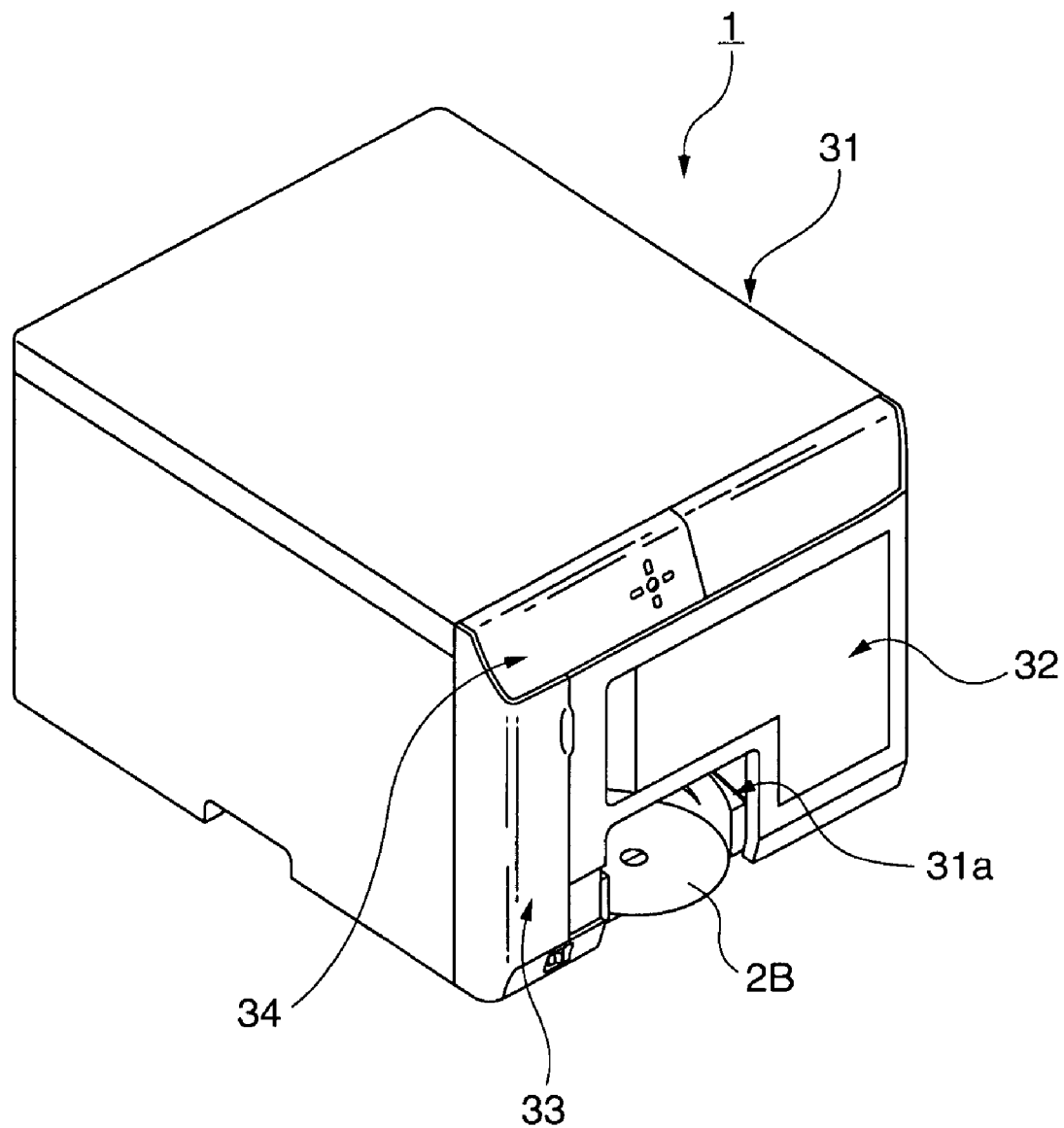
FIG. 1 is an oblique view of a media processing device according to a first embodiment of the invention.

As shown in FIG. 1, the media processing device 1 has a basically box-shaped case 31 with doors 32 and 33 that can open and close to the right and left disposed at the front of the case 31. An operating panel 34 having operating buttons, a power button, a keypad, and a fingerprint reader, for example, is disposed above the doors 32 and 33. A rectangular media exit 31a that is open to the outside for removing processed media is disposed below the one operable door 32 with the long side of the media exit 31a horizontal.

Figure 2:
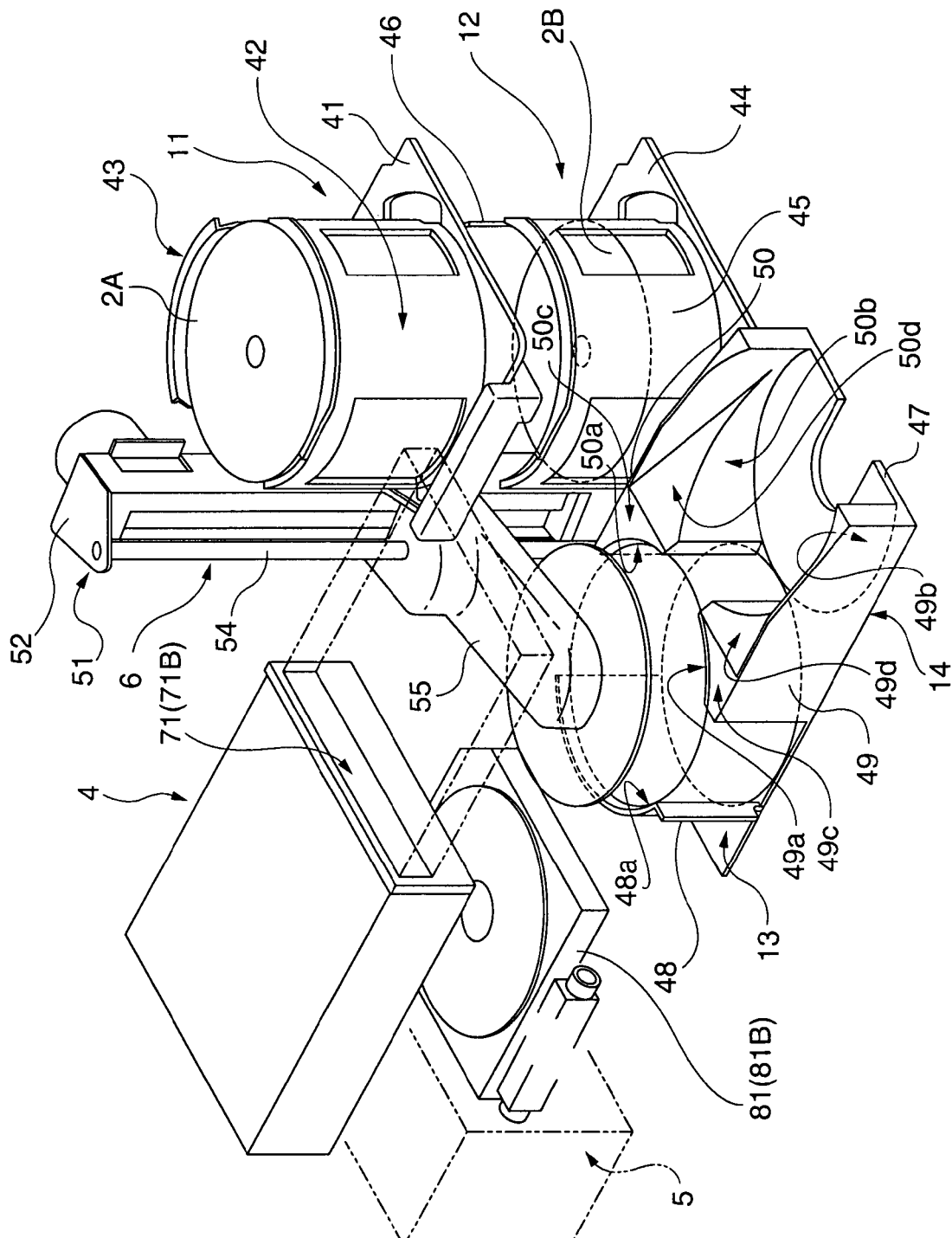
FIG. 2 is an oblique view showing the main internal parts of the media processing device shown in FIG. 1.

As shown in FIG. 2, a blank media stacker 11 (target media storage means) and a processed media stacker 12 (target media storage means) are disposed coaxially one above the other inside the case 31 of the media processing device 1 on the right side as seen from the front. The blank media stacker 11 stores blank media (also referred to as "discs" below) 2A that have not passed through the data writing process and label printing process. The processed media stacker 12 stores processed media 2B after the data writing process and label printing process have been applied.

The blank media stacker 11 has a slide tray 41 that can be pulled horizontally out to the front, and a pair of left and right curved side walls 42 and 43 disposed vertically on top of the slide tray 41, thus rendering a stacker that receives discs 2 from the top opening and holds the discs 2A stacked coaxially. The task of storing or replenishing media 2A to be processed (referred to below as target media) in the blank media stacker 11 can be done easily by opening the operable door 32 and pulling the slide tray 41 out to the front.

The processed media stacker 12 below the blank media stacker 11 is identically constructed, and has a slide tray 44 that can be pulled horizontally out to the front, and a pair of left and right curved side walls 45 and 46 disposed vertically on top of the slide tray 44, thus rendering a stacker that receives processed media 2B from the top opening and holds the discs 2B stacked coaxially.

The blank media stacker 11 and the processed media stacker 12 can each hold 50 (=n) discs in this embodiment of the invention.

A general purpose stacker 13 is disposed behind and to the left of the blank media stacker 11 and processed media stacker 12. The general purpose stacker 13 (target media storage means) can be used to store processed discs 2B or to store media that is rejected because the data writing process failed. A discharge media stacker 14 (target media storage means) that is used for discharging the processed discs 2B to the outside is located in front of the general purpose stacker 13. These stackers 13 and 14 have a common base 47 and side walls 48, 49, and 50 rising vertically from the base 47.

The rear general purpose stacker 13 is composed of the curved inside circumference surface 48a of the rear side wall 48, and the curved inside circumference surfaces 49a and 50a on the back side of the left and right side walls 49 and 50, and stores the processed discs 2B received from the top opening rendered by these side walls stacked coaxially.

The front discharge media stacker 14 is composed of the curved inside circumference surfaces 49b and 50b on the front side of the left and right side walls 49 and 50, and stores the processed disc 2B received from the top opening rendered by these side walls stacked coaxially.

The top surfaces 49c and 50c of the left and right side walls 49 and 50 are substantially triangular flat surfaces, and sloped guide surfaces 49d and 50d that slope to the front are formed contiguously to the front edges of the top surfaces 49c and 50c. These sloped guide surfaces 49d and 50d continue to the top edge part of the left and right inside circumference surfaces 49b and 50b of the discharge media stacker 14.

In this embodiment of the invention the general purpose stacker 13 can hold 30 (=n1) target discs, and the discharge media stacker 14 can hold 20 (=n2) target discs.

Target media (discs) means media that are processed by the processes executed by the media processing device 1, and include both blank media (discs) 2A and processed media (discs) 2B.

Figure 3:
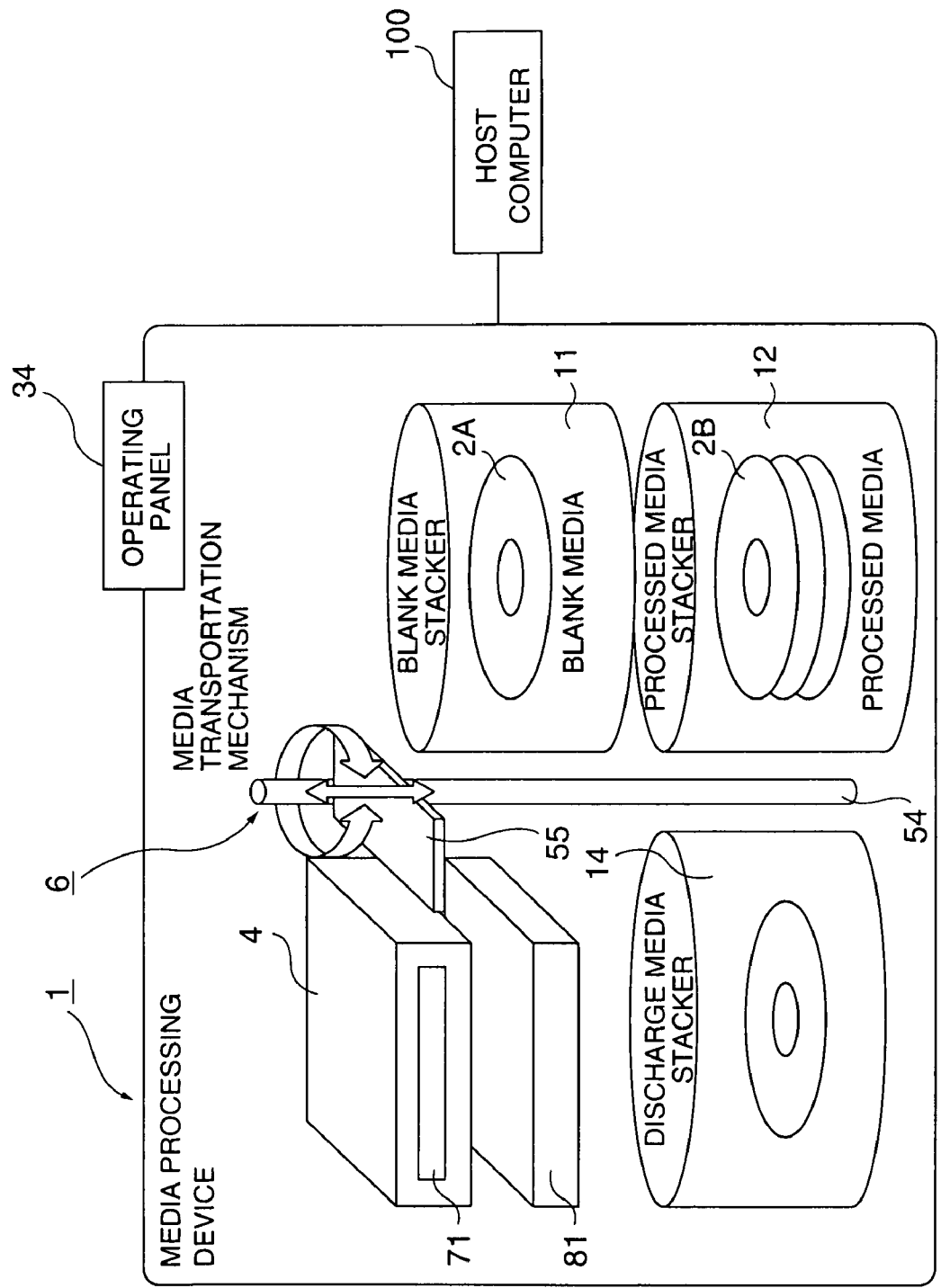
FIG. 3 is a schematic view of the mechanical arrangement of the media processing device shown in FIG. 1.

As shown in FIG. 2 and FIG. 3, a media transportation mechanism 6 (media transportation means) is disposed behind the blank media stacker 11 and processed media stacker 12. The media transportation mechanism 6 includes a chassis 51 that is attached vertically to the case 31, a vertical guide shaft 54 that rises vertically between the top and bottom horizontal support plates 52 and 53 of the chassis 51, and a media transportation arm 55 that is attached to this vertical guide shaft 54. The media transportation arm 55 can travel up and down on the vertical guide shaft 54, and can pivot right and left around the vertical guide shaft 54.

A media drive 4 (data writing means) is located at the top and a label printer 5 (printing means) is located at the bottom behind the media transportation mechanism 6. In FIG. 2 the media tray 71 of the top media drive 4 is shown in the retracted position 71B inside the media drive 4, and the printer tray 81 of the bottom label printer 5 is shown in the rear media printing position 81B. The label printer 5 is an inkjet printer that uses ink cartridges (not shown in the figure) of various colors as the ink supply source, and the ink cartridges are installed to a cartridge housing (not shown in the figure).

Internal Arrangement of the Media Processing Device

The internal processes of the media processing device 1 are described next.

Figure 4:
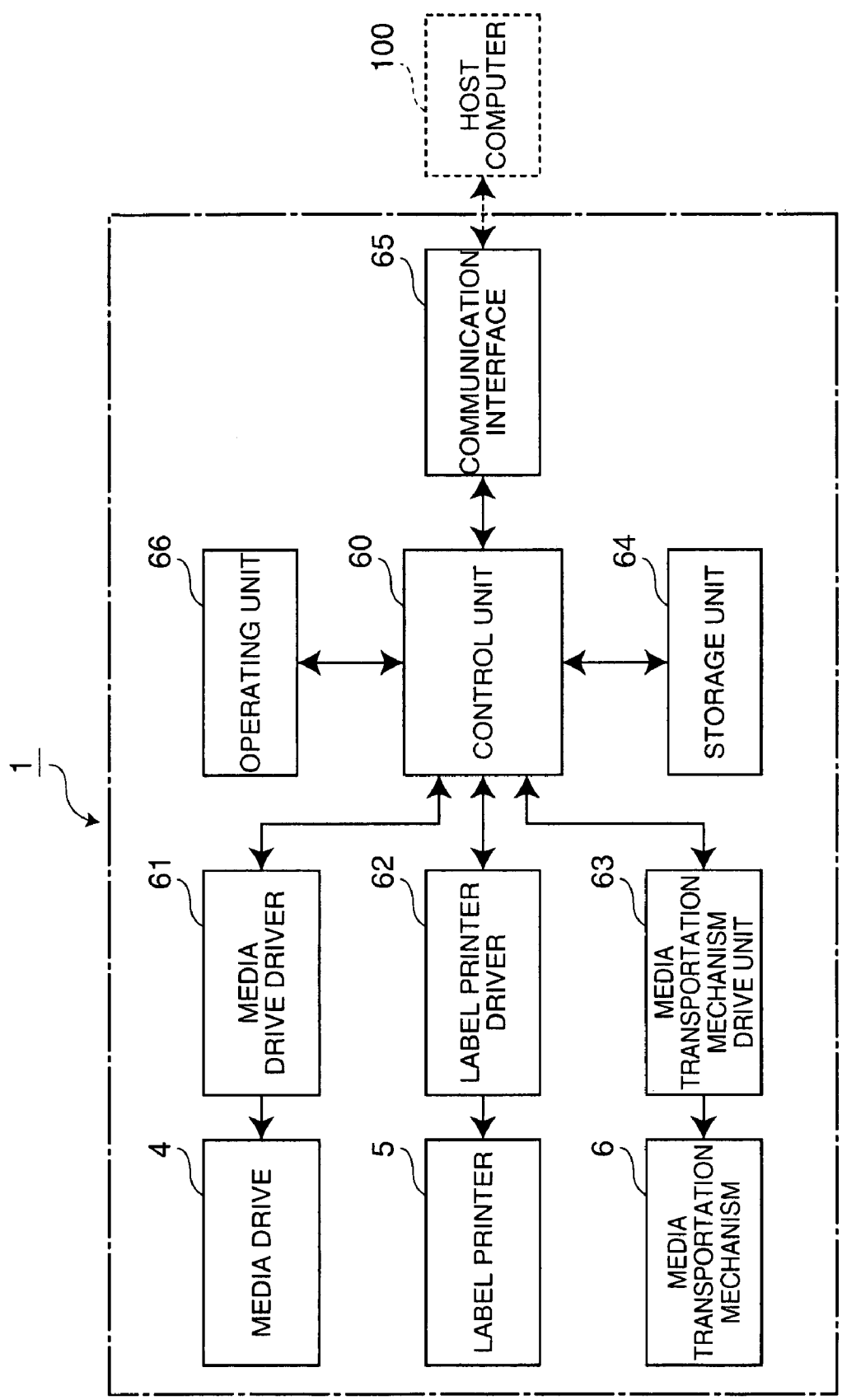
FIG. 4 is block diagram of the media processing device shown in FIG. 1.

FIG. 4 is a block diagram showing the internal arrangement of the media processing device 1. As shown in the figure, the media processing device 1 has a control unit 60 that controls the other parts, and controls the media drive driver 61, the label printer driver 62, and the media transportation mechanism drive unit 63 (media transportation means) that are also inside the media processing device 1.

The media drive driver 61 controls driving of the media drive 4. The label printer driver 62 controls driving of the label printer 5. The media transportation mechanism drive unit 63 controls driving of the media transportation mechanism 6.

The media processing device 1 also has storage unit 64 that temporarily stores data to be written to the CD and image data for printing a label on the label side of the CD, and a communication interface 65. The control unit 60 is connected to the host computer 100 by the communication interface 65 over a dedicated line or a public communication line.

The control unit 60 usually controls the media production process (including data writing operation and label printing operation) based on commands supplied form the host computer 100. The host computer 100 supplies a plurality of commands bracketed by a preceding start process command and a following end process command. The control unit 60 batch processes these plural commands, executes the commands sequentially from the first command, and returns a response to the host computer 100 when executing all commands ends normally. If any one of the commands could not be executed normally, the control unit 60 immediately returns a response indicating the command that produced an error to the host computer 100, and interrupts processing all of the remaining commands. The host computer 100 interprets the process result based on the response from the control unit 60 of the media processing device 1. If there is a command that could not be processed normally, the host computer 100 displays the presumed cause of the failure based on the reported command error on the monitor (not shown in the figure) of the host computer 100.

The operating unit 66 receives instructions from the operating buttons, power switch, keypad, and fingerprint detector included in the operating panel 34, and sends corresponding operating instructions to other parts of the media processing device 1 through the control unit 60.

The media drive 4, the media drive driver 61, and the control unit 60 together render a data writing means.

The label printer 5, the label printer driver 62, and the control unit 60 together render a printing means.

The media transportation mechanism 6, the media transportation mechanism drive unit 63, and the control unit 60 together render a media transportation means.

Figure 5:
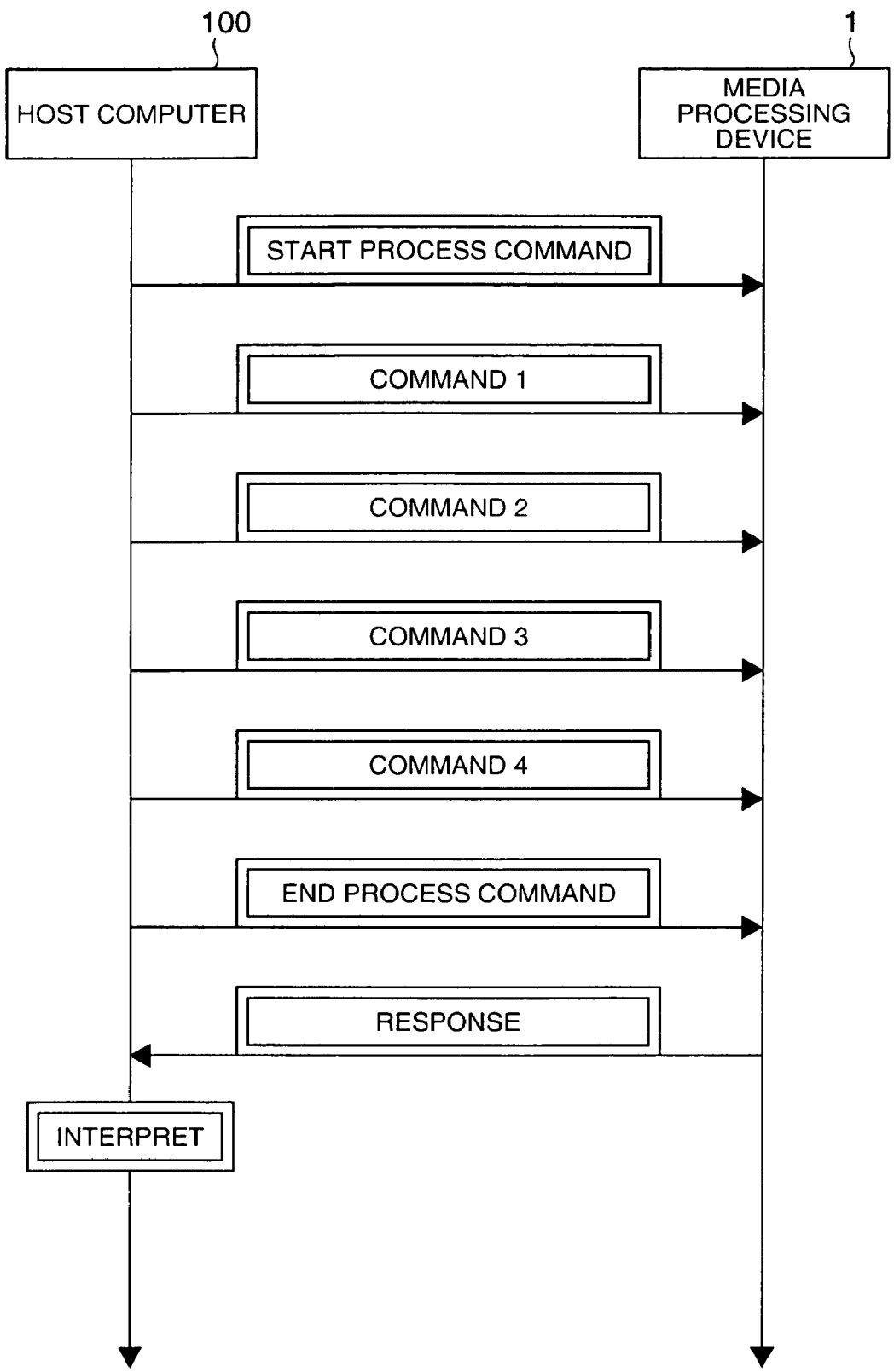
FIG. 5 is a flow chart describing data communication between the host computer and the media processing device shown in FIG. 1.

FIG. 5 is a timing chart describing data communication with the host computer 100.

The four commands 1 to 4 (one command set) in the series bracketed by the start process command and end process command are, for example, a command (command 1) for moving the media transportation arm 55 to the blank media stacker 11, a command (command 2) for picking up an unused blank disc 2A from the blank media stacker 11, a command (command 3) for transporting the picked up blank disc 2A to the media drive 4, and a command (command 4) for releasing the blank disc 2A onto the media tray 71 of the media drive 4. When such a command set is received from the host computer 100, the control unit 60 sequentially executes the commands in the set. This process is described in the flow chart in FIG. 6.

Figure 6:
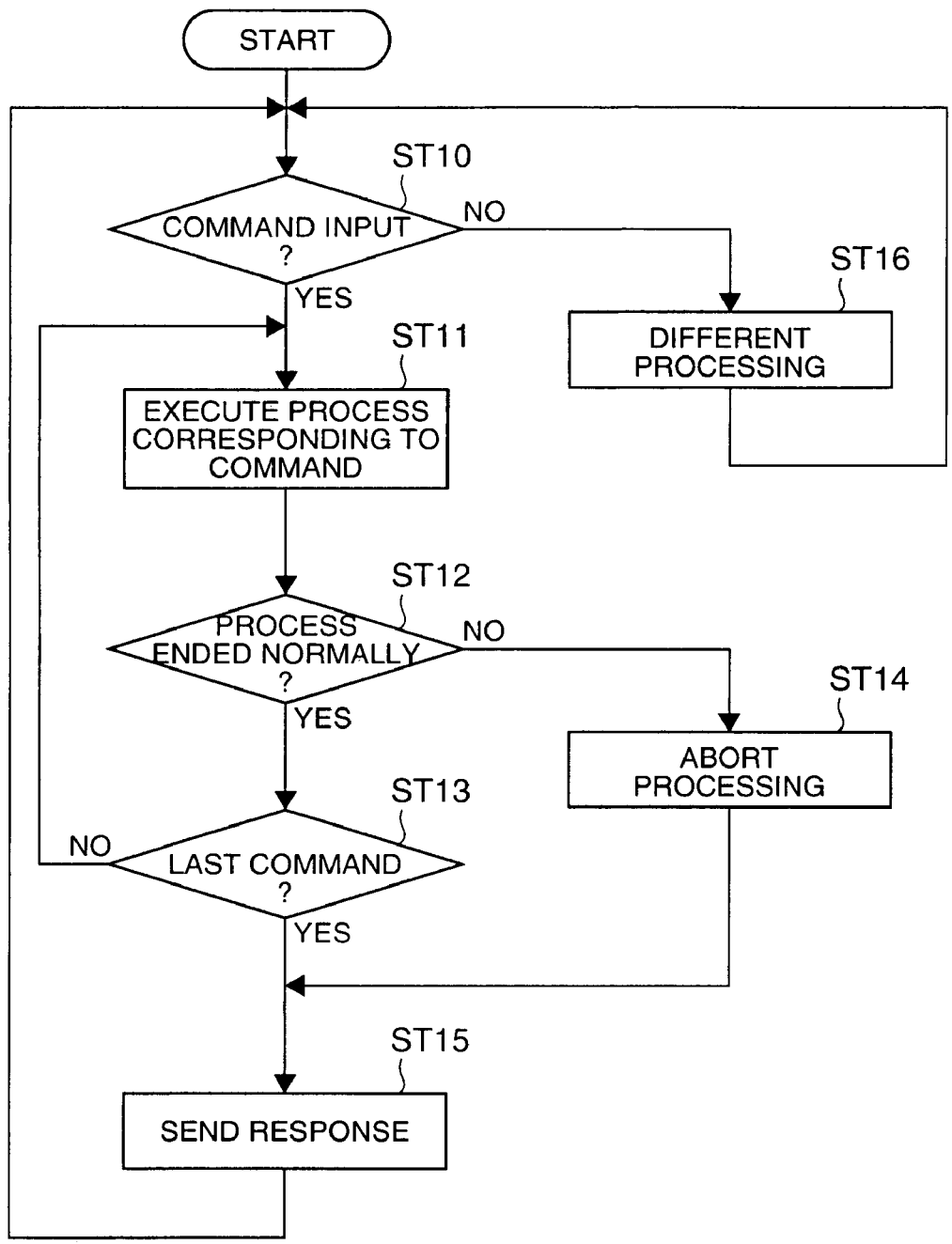
FIG. 6 is a flow chart describing the operation of the media processing device shown in FIG. 1.

Referring to FIG. 6, the control unit 60 first determines if a command was input from the host computer 100 (step ST10). If a command was not input from the host computer 100 (step ST10 returns No), a different process is executed (step ST16) and control returns to step ST10.

If a command was input from the host computer 100 (step ST10 returns Yes), the control unit 60 instructs the appropriate unit to execute the process corresponding to the command (step ST11). For example, in the case of command 1 for moving the media transportation arm 55 to the blank media stacker 11, an instruction for executing the process corresponding to command 1 is applied to the media transportation mechanism drive unit 63. When the media transportation mechanism drive unit 63 receives this instruction, it operates the media transportation arm 55 to move to the blank media stacker 11. When moving the media transportation arm 55 is completed, information denoting completion of the action is sent from the media transportation mechanism drive unit 63 to the control unit 60.

After instructing the media transportation mechanism drive unit 63 to execute the process corresponding to command 1, the control unit 60 determines if the process of command 1 was executed normally (step ST12). If the process executed normally (step ST12 returns Yes), whether the current command is the last command in the command set is determined in order to execute the process corresponding to the next command. If the current command is not the last command, the procedure returns to step ST11 and the process corresponding to the next command is executed.

This loop repeats until the processes corresponding to all of the commands have executed normally, and a response is then returned (step ST15). The response in this case tells the host computer 100 that the processes corresponding to all of the commands executed normally.

If the detected command is command 2, that is, a command for picking up an unused blank disc 2A from the blank media stacker 11, an instruction for executing the process corresponding to command 2 is applied to the media transportation mechanism drive unit 63. When the media transportation mechanism drive unit 63 receives this command, it lowers the media transportation arm 55 to the blank media 2A on the blank media stacker 11 and picks up a blank disc 2A. When picking up a blank disc 2A is completed, information denoting completion of the action is sent from the media transportation mechanism drive unit 63 to the control unit 60.

If the detected command is command 3, that is, a command for transporting the picked-up blank disc 2A to the media drive 4, an instruction for executing the process corresponding to command 3 is applied to the media transportation mechanism drive unit 63. When the media transportation mechanism drive unit 63 receives this command, it moves the media transportation arm 55 to the media drive 4. When moving of the media transportation arm 55 is completed, information denoting completion of the action is sent from the media transportation mechanism drive unit 63 to the control unit 60

If the detected command is command 4, that is, a command for releasing the blank disc 2A onto the media tray 71 of the media drive 4, the control unit 60 applies an instruction for executing the process corresponding to command 4 to the media drive driver 61. More specifically, when the media drive driver 61 receives this command, the media drive driver 61 first controls the media drive 4 to open the media tray 71 to the media transfer position 71B. When the media tray 71 of the media drive 4 opens to the media transfer position 71B (see FIG. 2), the media drive driver 61 sends information denoting completion of the action to the control unit 60. The control unit 60 then instructs the media transportation mechanism drive unit 63 to execute the process corresponding to command 4. When the media transportation mechanism drive unit 63 receives this command, it lowers the media transportation arm 55 to just above the media tray 71 of the media drive 4 and releases the blank disc 2A held by the media transportation arm 55. When releasing of the blank disc 2A onto the media tray 71 is completed, information denoting completion of the action is sent from the media transportation mechanism drive unit 63 to the control unit 60.

If step ST12 determines that the process did not execute normally (step ST12 returns No), processing is aborted (step ST14) and the command response is returned to the host computer 100 (step ST15). Aborting the process in this case means that processing all remaining commands is also aborted. For example, if the process corresponding to command 2 did not execute normally, the processes for command 3 and command 4 are aborted. By aborting execution of the processes corresponding to all remaining commands when one process produces an error avoids running meaningless processes. Furthermore, by sending a response for the aborted command to the host computer 100, the host computer 100 can know what command was aborted and can quickly identify where there is a failure in the media processing device 1.

The media processing device 1 according to this embodiment of the invention thus sequentially executes processes corresponding to each of the received commands when a command set containing a plurality of commands bracketed by a start process command and an end process command is received from the host computer 100. The response to the end process command after executing the process corresponding to the last command returns the result of executing the plural processes to the host computer 100. As a result, the number of times responses are sent and received can be reduced and the time required to interpret the response and send the next command can be shortened compared with the related art method of returning a response each time a single command is received from the host computer. The amount of communication data and the number of communication processes are therefore reduced, and the performance of the media processing device 1 is improved.

The media processing device 1 sequentially executes processes corresponding to a plurality of control commands, abandons all remaining commands if any process ends in an error, and returns a response for the control command that produced an error to the host computer 100. The host computer 100 can therefore determine what control command produced an error and can quickly identify where there is a problem in the media processing device 1.

Furthermore, because executing the processes corresponding to all remaining control commands is aborted if a process ends in an error, executing meaningless processes can be avoided.

The foregoing embodiment of the invention produces a CD, DVD, or similar medium by way of example, but the invention can also be used to produce various types of external recording media, including optical discs such as CDs and DVDs, magneto-optical discs, semiconductor memory, and magnetic recording media. The external recording medium writing device (media drive) can obviously be a device that writes and produces only one type of external recording media, or a device that can write and produce different types of external recording media.

Embodiment 2

Figure 7:
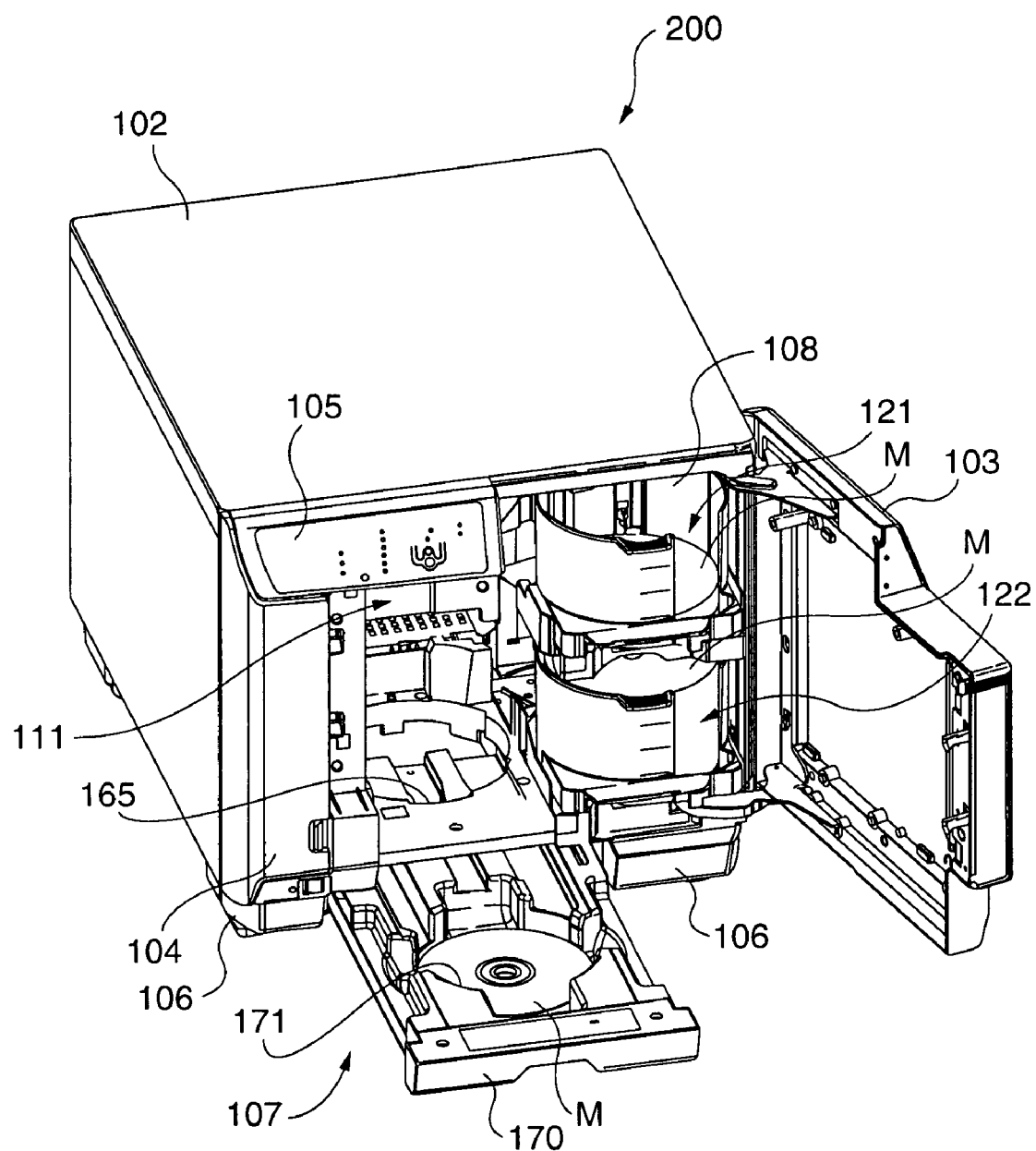
FIG. 7 is an oblique view showing the main internal parts of a media processing device according to a second embodiment of the invention with the front doors are open.
Figure 8:
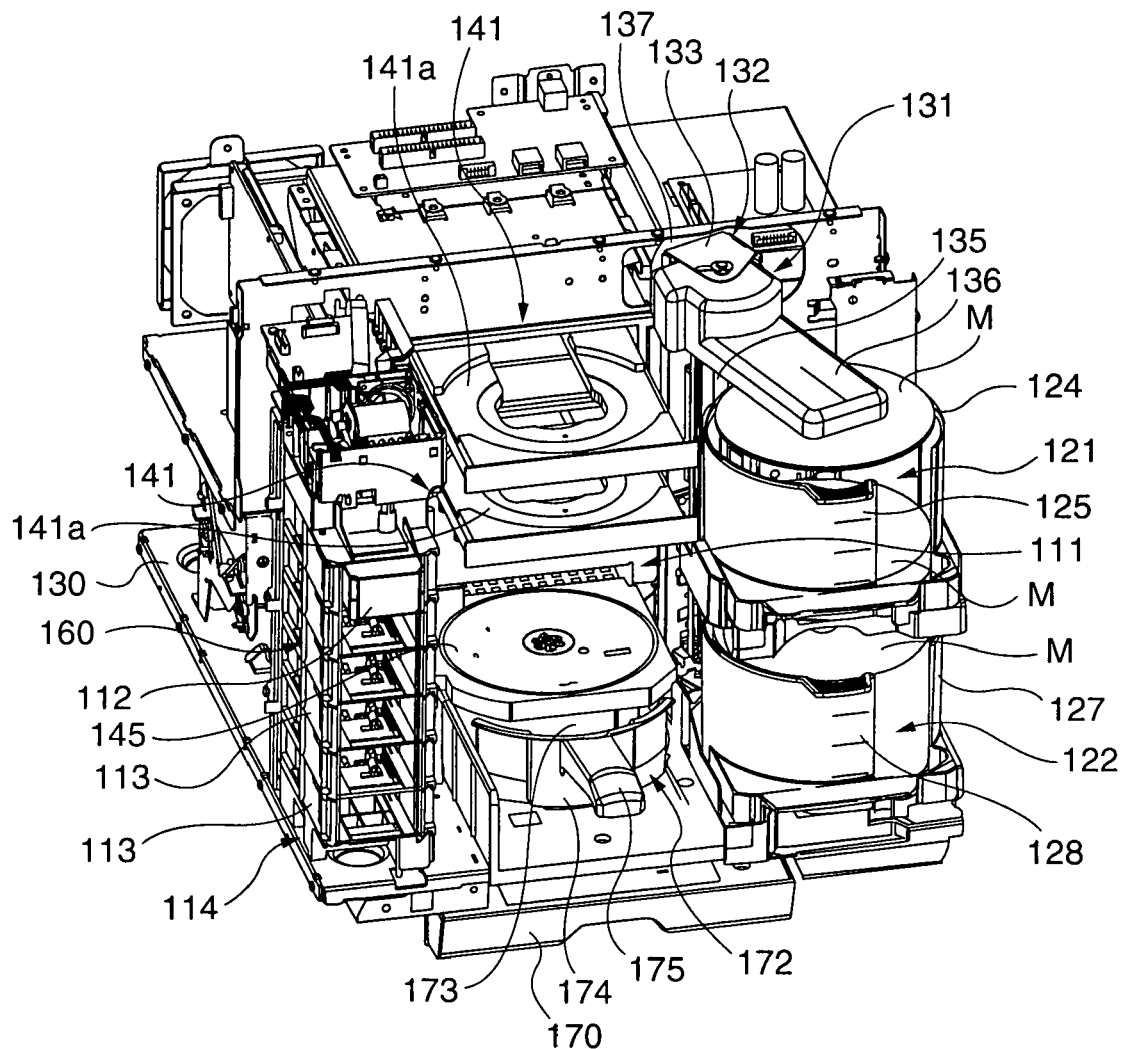
FIG. 8 is an oblique view showing the main internal parts of a media processing device according to a second embodiment of the invention.
Figure 9:
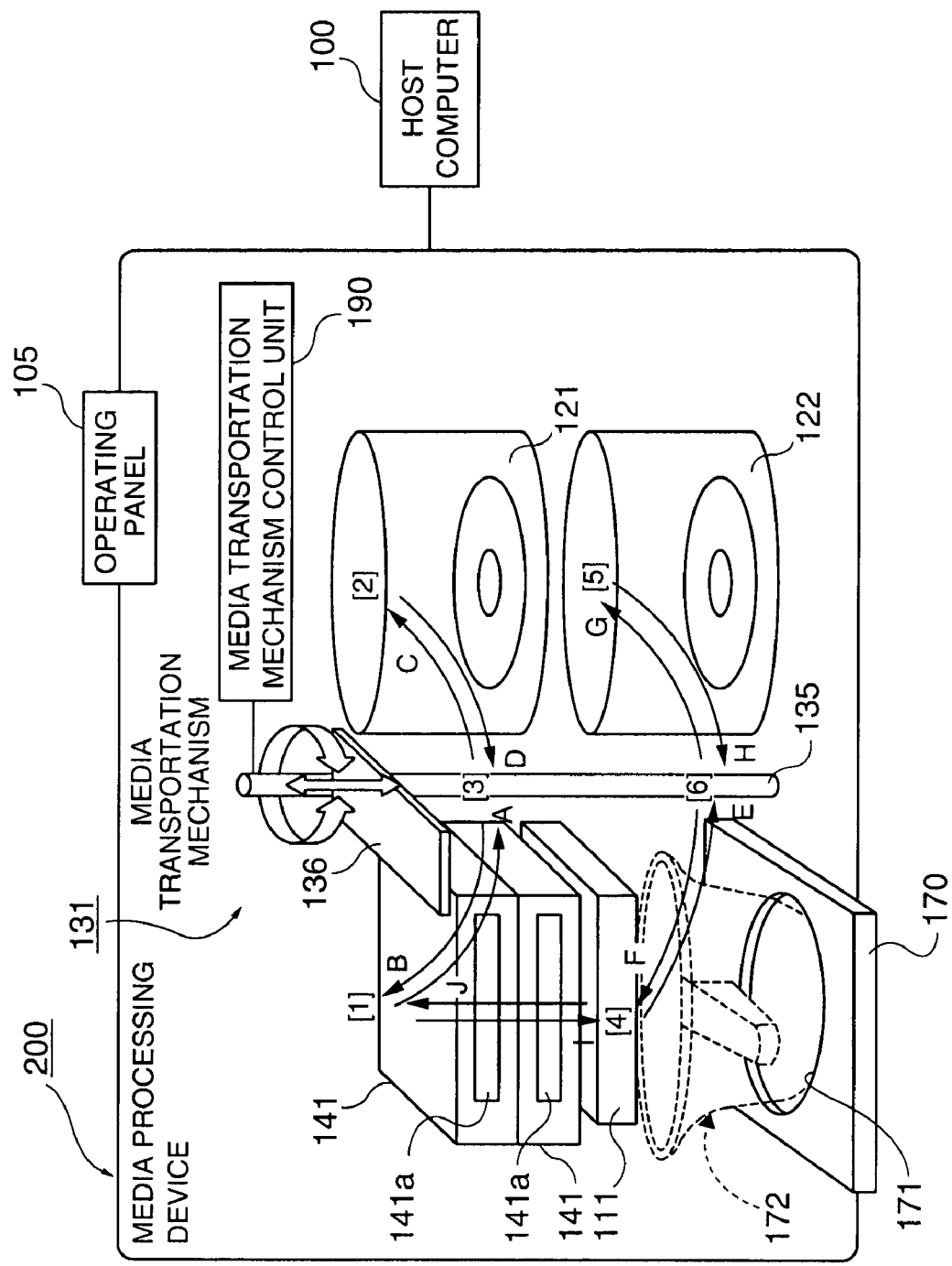
FIG. 9 is describes the mechanical arrangement of a media processing device according to the second embodiment of the invention.

A second embodiment of a media processing device according to the present invention is described next with reference to the accompanying figures. FIG. 7 is an oblique view showing the appearance of the media processing device according to this embodiment of the invention when the front doors are open, FIG. 8 is an oblique view of the major internal parts of the media processing device, and FIG. 9 is a schematic block diagram showing the mechanical arrangement of the media processing device.

Arrangement of the CD Publisher

As shown in FIG. 7, this media processing device 200 is a media processing device for writing data to disc-shaped media such as CD and DVD media (referred to as simply "discs" below) and printing on the label side of the discs, and has a basically box-shaped case 102. Right and left doors 103 and 104 that can open and close are disposed at the front of the case 102. An operating panel 105 having indicators and operating buttons, for example, is disposed at the top left part of the case 102, and support legs 106 projecting downward are disposed on the left and right sides at the bottom of the case 102. A drawer mechanism 107 is disposed between the left and right legs 106.

The operable door 103 on the right side as seen from the front opens and closes the opening 108 at the front of the media processing device 200 as shown in FIG. 7, and is used for opening and closing the opening 108 in order to load unused (blank) media M through the opening 108 and to remove finished media M through the opening 108.

The other operable door 104 on the left side as seen from the front is opened and closed to replace the ink cartridges 112 of the label printer 111 shown in FIG. 8. Opening the operable door 104 exposes the cartridge carrier 114, which has a plurality of cartridge holders 113 arranged vertically.

A first media stacker 121 (media storage means) and a second media stacker 122 (media storage means) are disposed one above the other inside the case 102 of the media processing device 200 so that the centers of the media M are coaxially aligned. The first media stacker 121 stores a plurality (such as 50) of blank media M (also referred to as "discs" below) that have not passed through the data writing process. The second media stacker 122 stores a plurality (such as 50) of unused media M or processed media M. Both the first media stacker 121 and the second media stacker 122 can be freely installed to and removed from a respectively prescribed position.

The top first media stacker 121 has a pair of right and left curved side walls 124 and 125 disposed so that the media M can be received from the top opening and stored in a coaxial stack. Storing or replenishing media M in the first media stacker 121 can be done easily by opening the operable door 103 and pulling the first media stacker 121 out.

The bottom second media stacker 122 is constructed the same way having a pair of right and left curved side walls 127 and 128, rendering a stacker that can receive the media M from the top opening and store the media M in a coaxial stack.

A media transportation mechanism 131 is disposed behind the first media stacker 121 and the second media stacker 122. The media transportation mechanism 131 has a vertical guide shaft 135 that rises vertically between the main frame 130 and the top plate 133 of the chassis 132. A transportation arm 136 is supported so that it can move vertically and pivot on this vertical guide shaft 135. A drive motor 137 enables the transportation arm 136 to move vertically along the vertical guide shaft 135 and to pivot right and left around the vertical guide shaft 135.

Two media drives 141 are stacked vertically to the side of and behind the top and bottom stackers 121 and 122 and the media transportation mechanism 131, and the carriage (not shown in the figure) of the label printer 111 is disposed movably below these media drives 141.

Each of the media drives 141 has a media tray 141a that can move between a position for writing data to the media M and a media transfer position for loading and unloading the media M.

The label printer 111 has a media tray 145 that can move between a printing position for printing a label on the label side of the media M, and a media transfer position for loading and unloading the media M.

FIG. 8 shows the media trays 141a of the top and bottom media drives 141 pulled out to the media transfer position, and the media tray 145 of the label printer 111 below the media drives 141 in the forward media transfer position.

The label printer 111 can be an inkjet printer that uses ink cartridges 112 as the ink supply mechanism 160. This embodiment of the invention uses ink cartridges 112 in six different colors (black, cyan, magenta, yellow, light cyan, and light magenta). The ink cartridges 112 are loaded from the front into the cartridge holders 113 of the cartridge carrier 114.

A gap enabling the media transportation arm 136 of the media transportation mechanism 131 to ascend and descend is formed between the left and right side walls 124 and 125 of the first media stacker 121, and between the left and right side walls 127 and 128 of the second media stacker 122. A gap is also formed between the top first media stacker 121 and bottom second media stacker 122 so that the media transportation arm 136 of the media transportation mechanism 131 can pivot horizontally for positioning directly above the second media stacker 122. When both media trays 141a are retracted into the media drives 141, the transportation arm 136 of the media transportation mechanism 131 can descend to access the media tray 145 in the media transfer position.

When both media trays 141a are positioned in the data writing position and the media tray 145 is positioned in the inside printing position, the transportation arm 136 of the media transportation mechanism 131 can descend below the height of the media tray 145. A guide hole 165 (see FIG. 7) is formed below the media transfer position of the media tray 145 so that media M released when the transportation arm 136 descends to this position pass through the guide hole 165. Another media stacker (a separate stacker) described below is disposed in this guide hole 165.

The drawer mechanism 107 has a sliding tray 170 that can be pulled out from the main frame 130 to an open and closed position and stored below the main frame 130. As shown in FIG. 7, a stacker unit 171 formed as an open recess is disposed in the sliding tray 170. When the sliding tray 170 is in the storage position (closed position), the stacker unit 171 is positioned below the guide hole 165, and the center of the stacker unit 171 is positioned coaxially to the media trays 141a and media tray 145 in the media transfer position. The stacker unit 171 receives media M deposited through the guide hole 165, and stores only a relatively small number (such as 5 to 10) of discs M. The stacker unit 171 receives the media M from the top and stores the media M stacked coaxially.

A third media stacker 172 (a separate stacker) with a larger media M storage capacity than the stacker unit 171 can be installed to and removed from the guide hole 165 and the stacker unit 171 of the sliding tray 170 in the storage position.

This third media stacker 172 also has a pair of curved side walls 173 and 174, receives media M from the top opening between the walls, and can store a plurality of (such as 50) media M stacked coaxially. A gap enabling the media transportation arm 136 of the media transportation mechanism 131 to ascend and descend is formed between the left and right side walls 173 and 174. A handle 175 that is held by the user during installation and removal is disposed to a top part of one side wall 174.

When the third media stacker 172 is installed as shown in FIG. 8 and FIG. 9, the media M can be stored in the third media stacker 172 after blank media M are removed from the lower second media stacker 122 and recorded and printed by one of the media drives 141 and the label printer 111.

Furthermore, the first media stacker 121 on top and the second media stacker 122 on bottom can both be loaded with media M to the maximum storage capacity (50 discs+50 discs), all media M (50 discs) in the bottom second media stacker 122 can be sequentially processed and stored in the third media stacker 172, and then all media M (50 discs) in the top first media stacker 121 can be sequentially processed and stored in the emptied bottom second media stacker 122. Media M equal to the maximum storage capacity of the top first media stacker 121 and the bottom second media stacker 122 (50 discs+50 discs) can therefore be processed in one operation (batch processing mode).

In addition, when the third media stacker 172 is removed, blank media M can be taken from the top first media stacker 121 or the bottom second media stacker 122, data can be recorded and a label can be printed by the media drives 141 and label printer 111, and the processed media M can then be stored in the stacker unit 171 of the sliding tray 170 in the storage position.

Media M for which processing has been completed can thus be removed from the stacker unit 171 by pulling the sliding tray 170 out. More specifically, completed media M can be removed one or multiple discs at a time while the media M are processed and the operable door 103 remains closed (external discharge mode).

By combining the vertical travel and right and left pivoting actions of the transportation arm 136 of the media transportation mechanism 131, the media M can be desirably transported to the first media stacker 121, the second media stacker 122, the stacker unit 171 of the sliding tray 170 (or the third media stacker 172), the media tray 141a of each of the media drives 141, and the media tray 145 of the label printer 111.

Internal Arrangement of the Media Processing Device

The internal processes of the media processing device 200 are described next.

Figure 10:
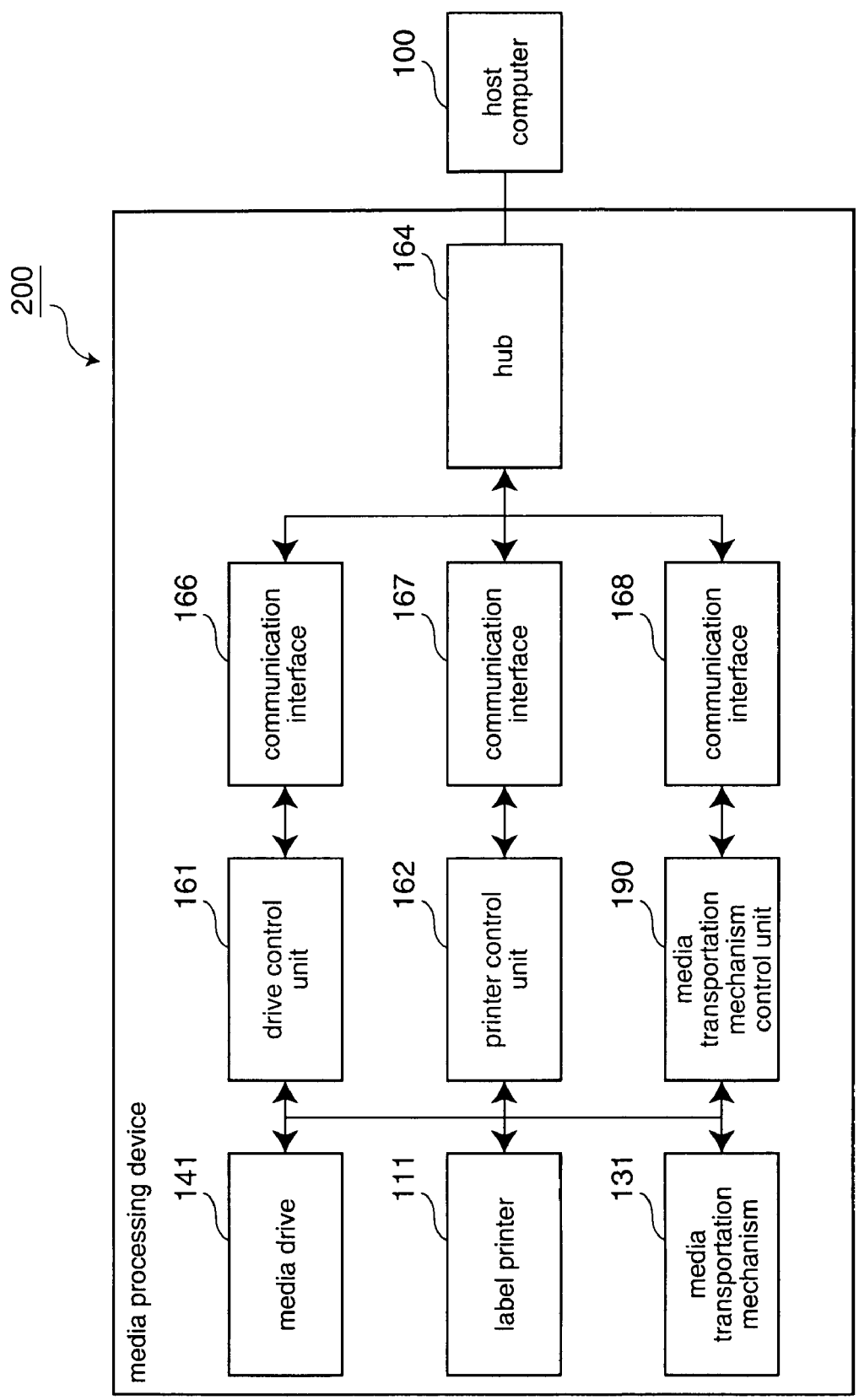
FIG. 10 is a block diagram describing the arrangement of the internal processes of the media processing device according to the second embodiment of the invention.
Figure 11:
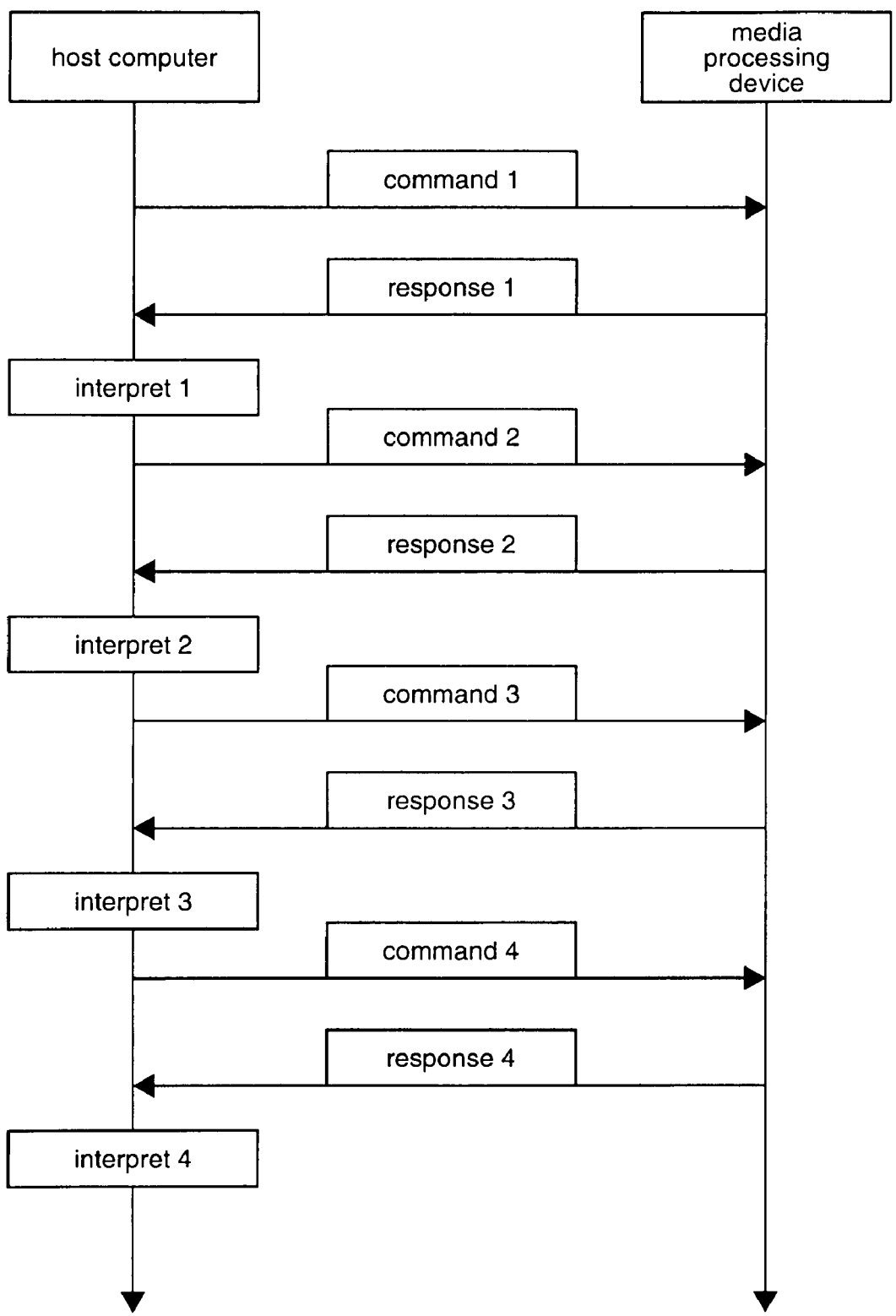
FIG. 11 is flow chart describing data communication between the host computer and a media processing device according to the related art.

FIG. 10 is a block diagram showing the internal arrangement of the media processing device 200.

In this embodiment of the invention three USB devices, a label printer 111, a media drive 141, and a media transportation mechanism 131, are communicably connected through a hub 164 for connecting multiple USB devices to a USB port of the host computer 100.

The USB devices and the host computer 100 are communicably connected through communication interfaces 166, 167, and 168.

The drive control unit 161 controls driving the media drive 141. The printer control unit 162 controls driving the label printer 111. The media transportation mechanism control unit 190 controls driving the media transportation mechanism 131.

The drive control unit 161 also has a storage unit for temporarily storing data to be written to the CD, and the printer control unit 162 has a storage unit for temporarily storing image data for printing a label on the label side of the CD.

The media processing device 200 controls the media production process (including data writing operation and label printing operation) based on commands supplied form the host computer 100. The host computer 100 supplies a plurality of commands bracketed by a preceding start process command and a following end process command. The control units 161, 162, and 163 can batch process these plural commands, execute the commands sequentially from the first command, and return a response to the host computer 100 when executing all commands ends normally. If any one of the commands could not be executed normally, the control unit immediately returns a response indicating the command that produced an error to the host computer 100, and interrupts processing all of the remaining commands. The host computer 100 interprets the process result based on the response from the control units 161, 162, and 163 of the media processing device 200. If there is a command that could not be processed normally, the host computer 100 displays the presumed cause of the failure based on the reported command error on the monitor (not shown in the figure) of the host computer 100.

Referring to FIG. 5 described in the first embodiment, the control units 161, 162, and 163 receive and sequentially process a set of commands bracketed by a start process command and end process command.

The four commands 1 to 4 (one command set) in the series bracketed by the start process command and end process command are, for example, a command (command 1) for moving the transportation arm 136 to the first media stacker 121, a command (command 2) for picking up an unused blank disc M from the first media stacker 121, a command (command 3) for transporting the picked-up blank disc M to the media drive 141, and a command (command 4) for releasing the blank disc M onto the media tray 141a of the media drive 141. This process is described with reference to the flow chart in FIG. 6 used to describe the first embodiment of the invention.

Referring to FIG. 6, the control unit first determines if a command was input from the host computer 100 (step ST10). If a command was not input from the host computer 100 (step ST10 returns No), a different process is executed (step ST16) and control returns to step ST10.

If a command was input from the host computer 100 (step ST10 returns Yes), the control unit 60 instructs the appropriate unit to execute the process corresponding to the command (step ST11). For example, in the case of command 1 for moving the transportation arm 136 to the first media stacker 121, the media transportation mechanism control unit 190 operates and moves the transportation arm 136 to the first media stacker 121.

When moving the transportation arm 136 is completed, the media transportation mechanism control unit 190 determines if command 1 was executed normally (step ST12). If the process executed normally (step ST12 returns Yes), whether the current command is the last command in the command set is determined in order to execute the process corresponding to the next command (step S13. If the current command is not the last command, the procedure returns to step ST11 and the process corresponding to the next command is executed.

This loop repeats until the processes corresponding to all of the commands have executed normally, and a response is then returned (step ST15). The media transportation mechanism control unit 190 returns a response telling the host computer 100 that the processes corresponding to all of the commands executed normally.

If the detected command is command 2, that is, a command for picking up unused blank media M from the first media stacker 121, the media transportation mechanism control unit 190 lowers the transportation arm 136 to the blank media M on the first media stacker 121 and picks up a blank disc M.

If the detected command is command 3, that is, a command for transporting the picked-up blank disc M to the media drive 141, the media transportation mechanism control unit 190 moves the transportation arm 136 to the media drive 141.

If the detected command is command 4, that is, a command for releasing the blank disc M onto the media tray 141*a* of the media drive 141, the media transportation mechanism control unit 190 waits for the drive control unit 161 to pull the media tray 141*a* out to the media transfer position, then lowers the transportation arm 136 to just above the media tray 141*a*, and releases the blank disc M held by the transportation arm 136.

If step ST12 determines that the process did not execute normally (step ST12 returns No), processing is aborted (step ST14) and the command response is returned to the host computer 100 (step ST15). Aborting the process in this case means that processing all remaining commands is also aborted. For example, if the process corresponding to command 2 did not execute normally, the processes for command 3 and command 4 are aborted. By aborting execution of the processes corresponding to all remaining commands when one process produces an error avoids running meaningless processes. Furthermore, by sending a response for the aborted command to the host computer 100, the host computer 100 can know what command was aborted and can quickly identify where there is a failure in the media processing device 200.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media processing device comprising:
    a data writing means that applies a data writing process to one side of a target medium;
    a printing means that applies a printing process to the other side of the target medium;
    a blank media storage means for storing blank media, which is the target media to which the data writing process and the printing process have not been applied;
    a processed media storage means for storing processed media, which is the target media after at least one of the data writing process and the printing process have been applied, wherein the blank media storage means and the processed media storage means are disposed one above the other; and
    a media transportation means that transports the target medium from any one of the data writing means, the printing means, and the blank media storage means and to a different one of the data writing means, the printing means, and the processed media storage means according to a control command sent from a host computer;
    wherein the media transportation means starts executing a plurality of control commands based on a start process command, and if the media transportation means determines that all of the control commands execute normally, sends a normal termination report to the host computer as the response to an end process command that is sent as a set with the start process command.

2. The media processing device described in claim 1, wherein if any one of the plural control commands is determined to have not executed normally, the media transportation means sends an error report for the control command that could not execute normally to the host computer as the response to the end process command.

3. The media processing device described in claim 2, wherein the media transportation means commands aborting execution of all remaining control commands if there is a control command that could not execute normally.

4. A media processing device comprising:
    a media drive that applies a data writing process to one side of a target medium;
    a printer that applies a printing process to the other side of the target medium;
    a plurality of media stackers configured to receive the target medium; and
    a media transportation mechanism that transports the target medium to any one of the media drive, the printer, and the plurality of media stackers according to a control command sent from a host computer primarily by a combination of vertical and pivotal movements of the media transportation mechanism;
    wherein the media transportation mechanism starts executing a plurality of control commands based on a start process command, and if the media transportation mechanism determines that all of the control commands execute normally, sends a normal termination report to the host computer as the response to an end process command that is sent as a set with the start process command.

5. The media processing device described in claim 4, wherein if any one of the plural control commands is determined to have not executed normally, the media transportation mechanism sends an error report for the control command that could not execute normally to the host computer as the response to the end process command.

6. The media processing device described in claim 5, wherein the media transportation mechanism commands aborting execution of all remaining control commands if there is a control command that could not execute normally.

7. A control method for a media processing device that has:
    a media drive that applies a data writing process to one side of a target medium;
    a printer that applies a printing process to the other side of the target medium;
    a media stacker that stores the target medium; and
    a media transportation mechanism that transports the target medium to any one of the media drive, the printer, and the media stacker according to a control command sent from a host computer,
    the control method comprising:
        the media transportation mechanism starting executing a plurality of control commands based on a start process command;
        the media transportation mechanism primarily performing a combination of vertical and pivotal movements to move between the media drive, the printer, and the media stacker;
        the media transportation mechanism determining if all of the control commands executed normally; and
        the media transportation mechanism sending a normal termination report to the host computer as the response to an end process command that is sent as a set with the start process command if the determination step determines that all control commands executed normally.

8. The media processing device control method described in claim 7, wherein:
if the determining step determines that any one of the plural control commands did not execute normally, an error report for the control command that could not execute normally is sent to the host computer as the response to the end process command.

9. The media processing device control method described in claim 8, wherein:
execution of all remaining control commands is aborted if the determining step determines that there is a control command that could not execute normally.

10. The media processing device described in claim 1, further comprising a general media storage means for storing one of: additional blank media, additional processed media, and media for which the data writing process failed.

11. The media processing device described in claim 1, wherein the media transportation means comprises:
a vertical guide shaft; and
a media transportation arm, wherein the arm is configured to move up and down the vertical guide shaft to move between the blank media storage means and the processed media storage means.

12. The media processing device described in claim 1, further comprising a control unit configured to batch process the plurality of control commands sequentially.

13. The media processing device described in claim 4, wherein the plurality of media stackers comprises a first media stacker and a second media stacker, wherein the first media stacker is configured to receive blank media, which is the target media to which the data writing process and the printing process have not been applied, and the second media stacker is configured to receive processed media, which is the target media to which at least one of the data writing process and the printing process have been applied.

14. The media processing device described in claim 13, wherein the first media stacker and the second media stacker are disposed one above the other.

15. The media processing device described in claim 13, wherein the plurality of media stackers further comprises a third media stacker, wherein the third media stacker is configured to store one of: additional blank media, additional processed media, and media for which the data writing process failed.

16. The media processing device described in claim 4, further comprising a control unit configured to batch process the plurality of control commands sequentially.

17. The media processing device control method described in claim 7, wherein:
the media processing device comprises a plurality of media stackers, including at least two of
a blank media stacker for storing blank media, which is the target media to which the data writing process and the printing process have not been applied,
a processed media stacker for storing processed media, which is the target media to which at least one of the data writing process and the printing process have been applied, and
a general media stacker for storing one of: additional blank media, additional processed media, and media for which the data writing process failed; and
the media transportation mechanism primarily performing a combination of vertical and pivotal movements includes performing the combination of vertical and pivotal movements to move between at least two of: the blank media stacker, the processed media stacker, and the general media stacker.

18. The media processing device control method described in claim 7, further comprising:
the media transportation mechanism batch processing the plurality of control commands sequentially.

19. The media processing device described in claim 1, wherein the plurality of control commands further comprises:
a command for moving the media transportation means to the blank media storage means;
a command for picking up a blank medium from the blank media storage means with the media transportation means;
a command for transporting the blank medium to at least one of the data writing means and the printing means using the media transportation means; and
a command for releasing the blank medium from the media transportation means and to at least one of the data writing means and the printing means.

20. The media processing device described in claim 4, wherein the plurality of control commands further comprises:
a command for moving the media transportation mechanism to one of the media stackers of the plurality of media stackers;
a command for picking up a blank medium from the media stacker with the media transportation mechanism;
a command for transporting the blank medium to at least one of the media drive and the printer using the media transportation mechanism; and
a command for releasing the blank medium from the media transportation mechanism and to at least one of the media drive and the printer.

* * * * *